(12) United States Patent
Bian et al.

(10) Patent No.: US 10,641,956 B1
(45) Date of Patent: May 5, 2020

(54) POLARIZERS AND POLARIZATION SPLITTERS PHASE-MATCHED WITH A BACK-END-OF-LINE LAYER

(71) Applicant: GLOBALFOUNDRIES Inc., Grand Cayman (KY)

(72) Inventors: Yusheng Bian, Ballston Lake, NY (US); Ajey Poovannummoottil Jacob, Watervliet, NY (US); Abu Thomas, Brookline, MA (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 0 days.

(21) Appl. No.: 16/291,346

(22) Filed: Mar. 4, 2019

(51) Int. Cl.
  *G02B 6/34* (2006.01)
  *G02B 6/122* (2006.01)
  *G02B 27/28* (2006.01)
  *G02B 6/43* (2006.01)

(52) U.S. Cl.
  CPC ............. *G02B 6/122* (2013.01); *G02B 6/43* (2013.01); *G02B 27/283* (2013.01)

(58) Field of Classification Search
  CPC ......... G02B 6/122; G02B 27/283; G02B 6/43
  See application file for complete search history.

(56) References Cited

U.S. PATENT DOCUMENTS

| | | | | |
|---|---|---|---|---|
| 6,310,995 B1* | 10/2001 | Saini | ...................... | B82Y 20/00 385/28 |
| 6,580,850 B1* | 6/2003 | Kazarinov | ......... | G02B 6/12 004 385/16 |
| 6,795,622 B2* | 9/2004 | Forrest | ................... | B82Y 20/00 372/6 |
| 7,532,784 B2* | 5/2009 | Tolshikhin | ......... | G02B 6/12007 385/14 |
| 7,583,869 B2* | 9/2009 | Kang | ...................... | H01S 5/026 385/129 |
| 8,098,969 B2* | 1/2012 | Tolstikhin | ............. | H01S 5/5018 385/14 |
| 9,502,069 B2* | 11/2016 | Peng | ..................... | G11B 5/6088 |
| 2010/0065726 A1* | 3/2010 | Zhong | ................. | G01N 21/648 250/227.24 |

(Continued)

OTHER PUBLICATIONS

Huang et al., "CMOS compatible horizontal nanoplasmonic slot waveguides TE-pass polarizer on silicon-on-insulator platform," Opt. Express 21, 12790-12796 (2013).

(Continued)

*Primary Examiner* — Ellen E Kim
(74) *Attorney, Agent, or Firm* — Thompson Hine LLP; Francois Pagette

(57) ABSTRACT

Structures including a waveguide core and methods of fabricating a structure including a waveguide core. A back-end-of-line interconnect structure has an interlayer dielectric layer and a cap layer stacked over the interlayer dielectric layer. A waveguide core includes a section arranged beneath the cap layer. The waveguide core has a first index of refraction that varies as a function of width, and the cap layer has a second index of refraction. The section of the waveguide core has a width that is selected such that the first index of refraction is substantially equal to the second index of refraction to provide phase matching effective for coupling a portion of an optical signal from the waveguide core to the cap layer.

16 Claims, 10 Drawing Sheets

(56) References Cited

U.S. PATENT DOCUMENTS

| | | | |
|---|---|---|---|
| 2014/0199016 A1* | 7/2014 | Grot | G02B 6/10 |
| | | | 385/11 |
| 2017/0256277 A1* | 9/2017 | Peng | G11B 5/4866 |

OTHER PUBLICATIONS

Yin, Xiang, et al. "Ultra-compact TE-pass polarizer with graphene multilayer embedded in a silicon slot waveguide." Optics letters 40.8 (2015): 1733-1736.

Dai et al., "Compact broadband polarizer based on shallowly-etched silicon-on-insulator ridge optical waveguides," Opt. Express 18, 27404-27415 (2010).

Tien et al. "Integrated Cu-based TM-pass polarizer using CMOS technology platform." Photonics Global Conference (PGC), 2010. IEEE, 2010.

Zhang, et al. "Wideband and compact TE-pass/TM-stop polarizer based on a hybrid plasmonic Bragg grating for silicon photonics." Journal of Lightwave Technology 32.7 (2014): 1383-1386.

Xiong, Yule, et al. "High extinction ratio and broadband silicon TE-pass polarizer using subwavelength grating index engineering." IEEE Photonics Journal 7.5 (2015): 1-7.

Gamer, Sean M., et al. "Vertically integrated waveguide polarization splitters using polymers." IEEE Photonics Technology Letters 11.7 (1999): 842-844.

Lee, Chee-Wei. "A review of polarization dependence applications for asymmetric waveguides vertical couplers in compound semiconductor indium phosphide." International Journal of Optics 2011.

Kim, et al. "Vertical polarization beam splitter using a hybrid long-range surface plasmon polariton waveguide." Journal of Optics 16.2 (2014): 025501.

Debnath, Kapil, et al. "Highly efficient optical filter based on vertically coupled photonic crystal cavity and bus waveguide." Optics letters 38.2 (2013): 154-156.

Cai, et al. "Numerical analysis of polarization splitter based on vertically coupled microring resonator." Optics Express 14.23 (2006): 11304-11311.

Feng, et al. "A three-dimensional silicon nitride polarizing beam splitter." IEEE Photonics Technology Letters 26.7 (2014):706-709.

Feng, et al. "Vertically coupled silicon nitride microdisk resonant filters." IEEE Photonics Technol. Lett. 26.23 (2014): 2391-2394.

Ma, Youqiao, et al. "Low loss, high extinction ration and ultra-compact plasmonic polarization beam splitter." IEEE Photonics Technology Letters 26.7 (2014): 660-663.

* cited by examiner

POLARIZERS AND POLARIZATION SPLITTERS PHASE-MATCHED WITH A BACK-END-OF-LINE LAYER

BACKGROUND

The present invention relates to photonics chips and, more specifically, to structures including a waveguide core and methods of fabricating a structure including a waveguide core.

Photonics chips are used in many applications and systems including, but not limited to, data communication systems and data computation systems. A photonics chip integrates optical components, such as waveguides, optical switches, and bends, and electronic components, such as field-effect transistors, into a unified platform. Among other factors, layout area, cost, and operational overhead may be reduced by the integration of both types of components into a single photonics chip.

Polarizers and polarization splitters are types of optical components commonly found in integrated photonics chips. A polarizer is configured to receive a propagating optical signal having multiple modes (e.g., transverse electric (TE) mode and transverse magnetic (TM) mode) and allowing only one mode to propagate while the other mode is eliminated. A polarization splitter separates the different modes of a propagating optical signal and routes the different modes in different propagation directions.

Improved structures including a waveguide core and methods of fabricating a structure including a waveguide core are needed.

SUMMARY

In an embodiment of the invention, a structure includes a back-end-of-line interconnect structure having an interlayer dielectric layer and a cap layer stacked over the interlayer dielectric layer. The structure further includes a waveguide core having a section arranged beneath the cap layer. The waveguide core has a first index of refraction that varies as a function of width, and the cap layer has a second index of refraction. The section of the waveguide core has a width that is selected such that the first index of refraction is substantially equal to the second index of refraction to provide phase matching effective for coupling a portion of an optical signal from the waveguide core to the cap layer.

In an embodiment of the invention, a method includes forming a first waveguide core, forming an interlayer dielectric layer of a back-end-of-line interconnect structure, and forming a cap layer of the back-end-of-line interconnect structure over the interlayer dielectric layer and at least a first section of the first waveguide core. The first waveguide core has a first index of refraction that varies as a function of width, and the cap layer has a second index of refraction. The first section of the first waveguide core has a first width that is selected such that the first index of refraction is substantially equal to the second index of refraction to provide phase matching effective for coupling a portion of an optical signal from the first waveguide core to the cap layer.

BRIEF DESCRIPTION OF THE DRAWINGS

The accompanying drawings, which are incorporated in and constitute a part of this specification, illustrate various embodiments of the invention, and, together with a general description of the invention given above and the detailed description of the embodiments given below, serve to explain the embodiments of the invention. In the drawings, like reference numerals refer to like features in the various views.

DETAILED DESCRIPTION

Figure 1:
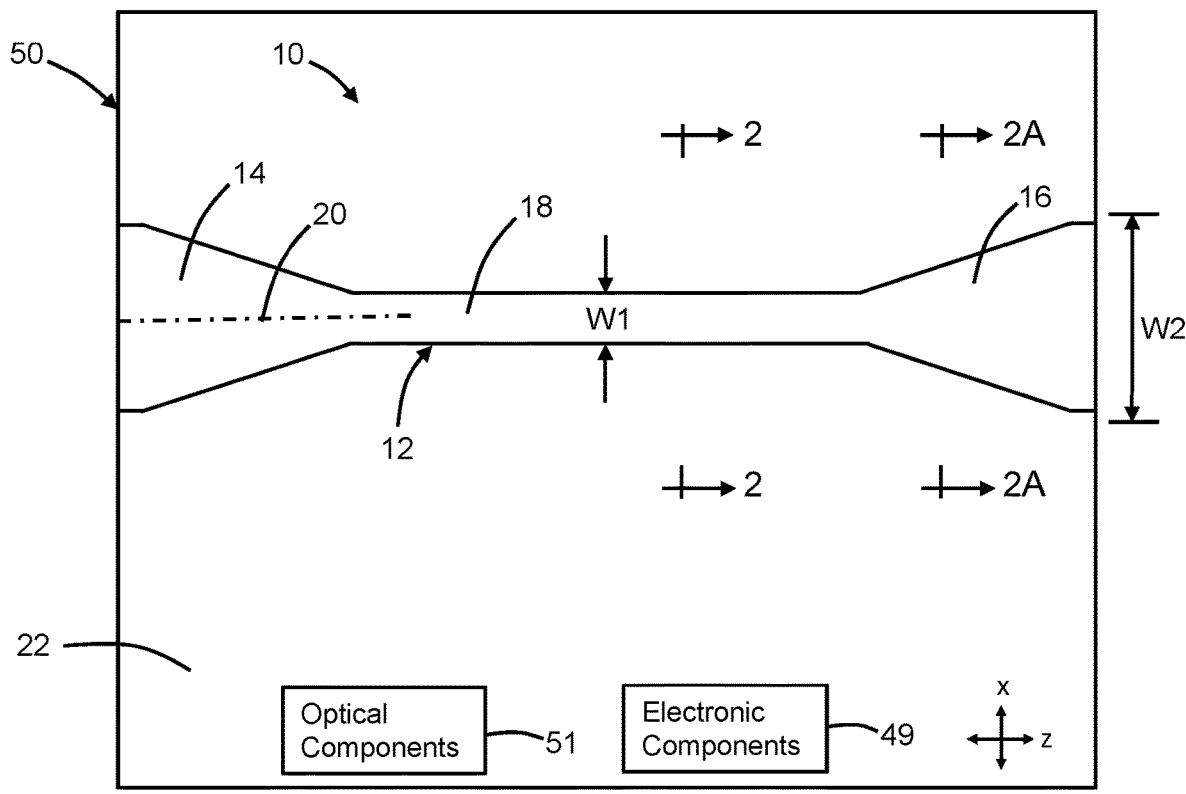
FIG. 1 is a top view of a photonics chip including a structure at an initial fabrication stage of a processing method in accordance with embodiments of the invention.
Figure 2:
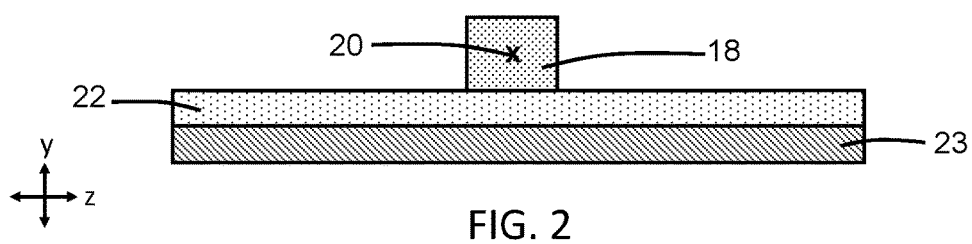
FIG. 2 is a cross-sectional view of the structure taken generally along line 2-2 in FIG.
Figure 2A:
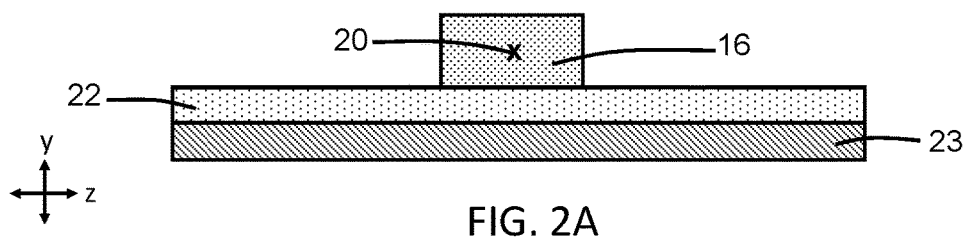
FIG. 2A is a cross-sectional view of the structure taken generally along line 2A-2A in FIG. 1.

With reference to FIGS. 1, 2, 2A and in accordance with embodiments of the invention, a structure 10 for a polarizer includes a waveguide core 12 that includes a tapered section 14, a tapered section 16, and a straight section 18 arranged laterally between the taper 14 and the taper 16 along a longitudinal axis 20. The straight section 18 has a width, W1, and the tapered sections 16, 18 each increase the width from the width, W1, of the straight section 18 to a width W2, that is greater than width, W1. The waveguide core 12 may be composed of single-crystal semiconductor material (e.g., single-crystal silicon). The waveguide core 12 may be formed by patterning the single-crystal semiconductor material of a device layer of a silicon-on-insulator (SOI) wafer with lithography and etching processes that form an etch mask over the device layer and etch the masked device layer with an etching process, such as reactive ion etching (RIE). The etch mask includes shapes that cover the tapered sections 14, 16 and the straight section 18 during the etching process. The waveguide core 12 may be arranged directly on a buried insulator layer 22 of a silicon-on-insulator (SOI) wafer. The buried insulator layer 22 may be composed of a dielectric material, such as silicon dioxide, and the buried insulator layer 22 may be arranged over a substrate 23 (e.g., a single-crystal silicon substrate). The etching process may be selected to stop on the buried insulator layer 22 after penetrating fully through the device layer. The buried insulator layer 22 may operate as a lower cladding providing confinement for the waveguide core 12.

Figure 3:
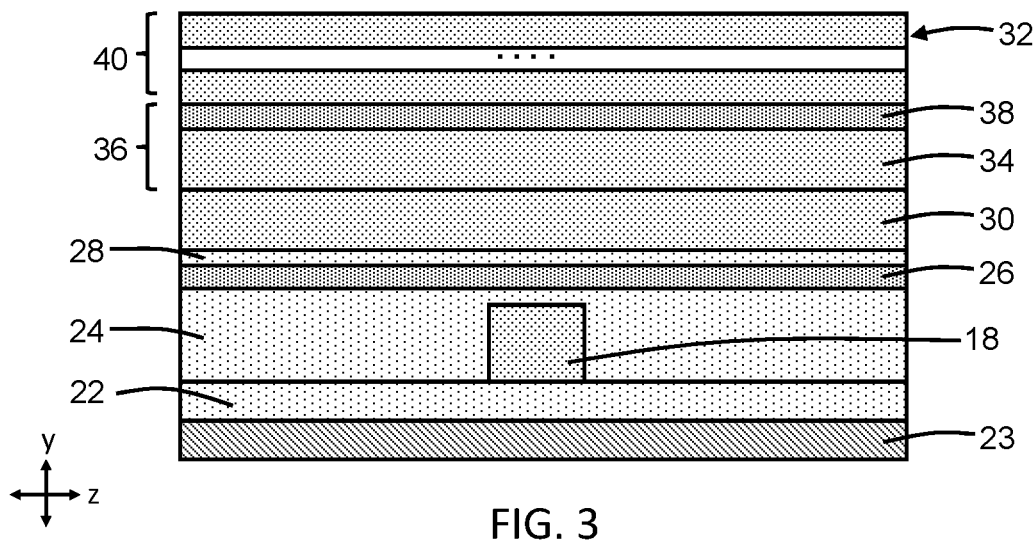
FIGS. 3 and 3A are cross-sectional views of the structure of FIGS. 2 and 2A, respectively, at a subsequent fabrication stage.
Figure 3A:
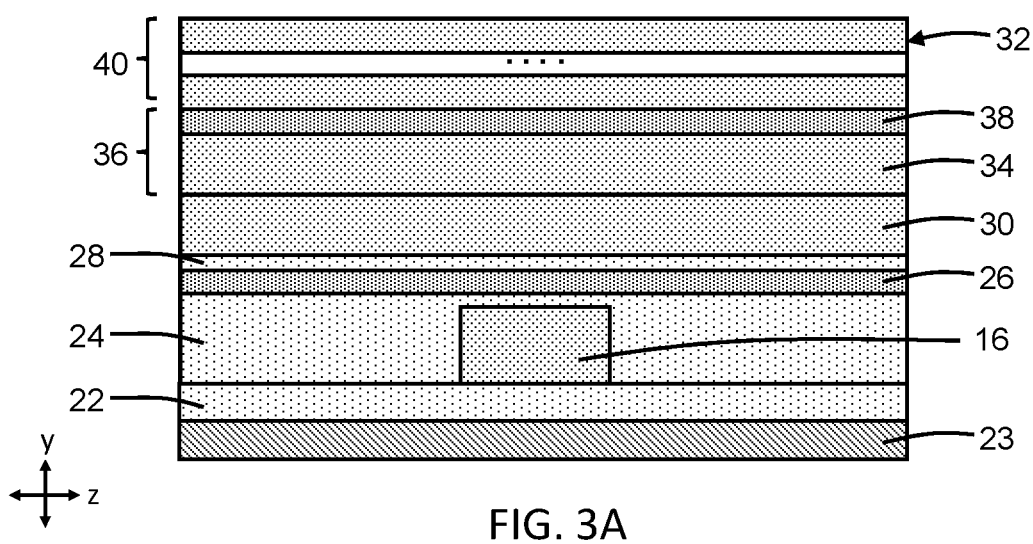
Figure 4:
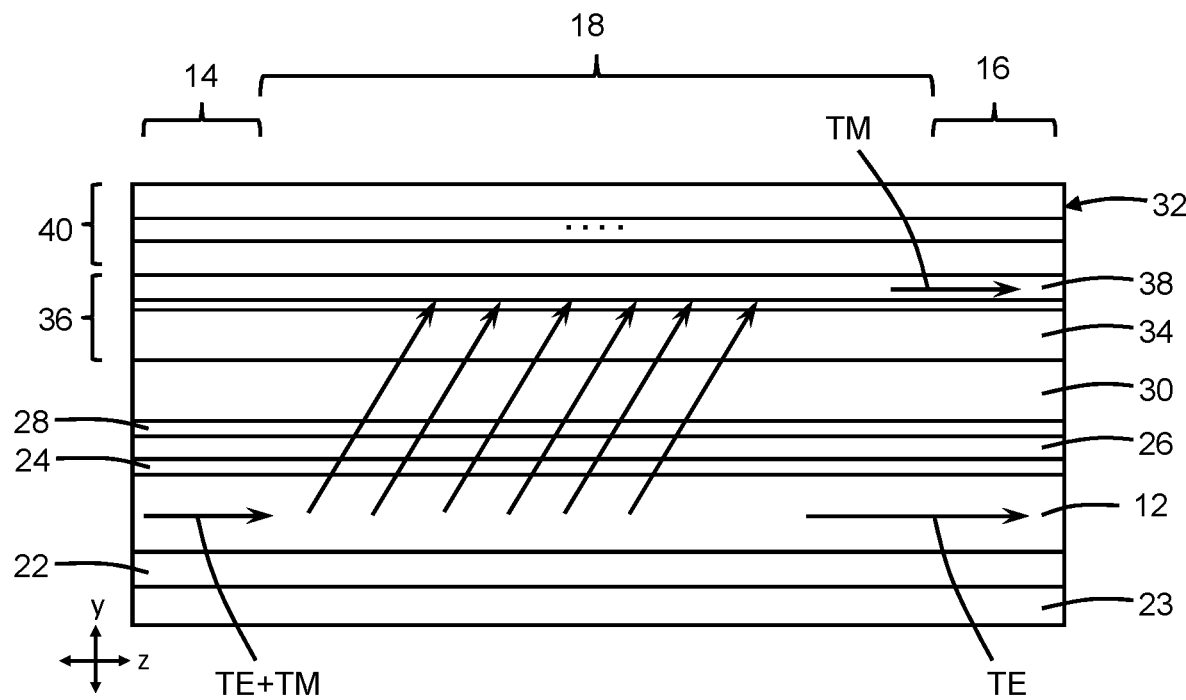
FIG. 4 is a diagrammatic side view of the structure of FIGS. 3 and 3A in which the paths for different modes of a propagating optical signal are illustrated.

With reference to FIGS. 3, 3A, 4 in which like reference numerals refer to like features in FIGS. 2, 2A and at a subsequent fabrication stage, a set of dielectric layers 24, 26, 28 arranged under the waveguide core 12. The dielectric layers 24, 26, 28, which are formed after forming the waveguide core 12, are composed of respective dielectric materials that are sequentially deposited. The dielectric layer 24 may be composed of a dielectric material, such as silicon dioxide, deposited by chemical vapor deposition and planarized with, for example, chemical mechanical polishing (CMP). The thickness of the dielectric layer 24 may be selected such that the waveguide core 12 is embedded or buried in the dielectric material of the dielectric layer 24. The dielectric layer 26 may be composed of dielectric material, such as silicon dioxide, deposited by chemical vapor deposition or atomic layer deposition over the dielectric layer 24. The dielectric layer 28 may be composed of dielectric material, such as silicon nitride, deposited by chemical vapor deposition or atomic layer deposition over the dielectric layer 26. The dielectric layer 26 is arranged over the dielectric layer 24, the dielectric layer 28 is arranged over the dielectric layer 26, and the dielectric layers 26, 28 are both arranged in the vertical direction (i.e., the y-direction) over the waveguide core 12 and the dielectric layer 24.

A dielectric layer 30 is formed by middle-of-line processing over the dielectric layer 28. The dielectric layer 30 may be composed of dielectric material, such as silicon dioxide, deposited by chemical vapor deposition using ozone and tetraethylorthosilicate (TEOS) as reactants. Contacts (not shown) may be present in the dielectric layer 30 at locations remote from the waveguide core 12.

An interconnect structure, generally indicated by reference numeral 32, is formed by back-end-of-line (BEOL) processing over the dielectric layer 30. The interconnect structure 32 may include an interlayer dielectric layer 34 of a metallization level 36 of the interconnect structure 32, and a cap layer 38 that is arranged over the interlayer dielectric layer 34. The interlayer dielectric layer 34 may be composed of an electrical insulator, such as silicon dioxide, a low-k dielectric material, or an ultra-low-k dielectric material, that is deposited by chemical vapor deposition. For example, the interlayer dielectric layer 34 may be composed of carbon-doped silicon oxide. The metallization level 36 may represent the closest metallization level in the interconnect structure 32 to the waveguide core 12 and substrate 23.

The cap layer 38 is composed of a dielectric material that has a different composition than the dielectric material of the interlayer dielectric layer 36. In an embodiment, the dielectric material of the cap layer 38 may be a high-index dielectric material having an index of refraction greater than the index of refraction of silicon dioxide. In an embodiment, the cap layer 38 may be composed of silicon carbon nitride (SiCN) (e.g., nitrogen-doped silicon carbide), commonly known as NBloK, deposited by chemical vapor deposition. In an alternative embodiment, the cap layer 38 may be composed of silicon nitride. The cap layer 38 protects the interlayer dielectric layer 34 from etching and lithography processes that may be used to form via openings and trenches (not shown) in other locations in the interlayer dielectric layer 36, as well as acting as a barrier diffusion layer for atomic metal residues on the top surface of the interlayer dielectric layer 34.

The interconnect structure 32 may include additional metallization levels 40, each including a cap layer and an interlayer dielectric layer, that are arranged over the metallization level 36.

The structure 10, in any of its embodiments described herein, may be integrated into a photonics chip 50 (FIG. 1) that includes electronic components 49 and additional optical components 51. For example, the electronic components 49 may include field-effect transistors that are fabricated by CMOS front-end-of-line (FEOL) processing.

In use and as diagrammatically indicated by the single-headed arrows in FIG. 4, an unmodulated optical signal propagating in the waveguide core 12 may arrive at an input port to the structure 10. The optical signal may contain multiple modes, such as a transverse electric (TE) mode and a transverse magnetic (TM) mode. The structure 10 may be used to allow a desired mode of the optical signal to propagate while eliminating an undesired mode. Because of phase matching between the waveguide core 12 and the cap layer 38, one of the modes (e.g., the TM mode) in the arriving optical signal may be shifted upwardly by the phase-matching between the waveguide core 12 and the cap layer 38. The undesired mode of the optical signal may be guided and absorbed by the cap layer 38, and does not couple back downward to the waveguide core 12. The desired mode (e.g., the TE mode) of the optical signal is not affected by the phase-matching and continues to propagate in the waveguide core 12 exits through an output port of the structure 10.

The structure 10 may be characterized by low insertion loss, low cross-talk and a high extinction ratio after transmission through the structure 10. The tapered section 14 provides a width reduction between a section (not shown) of the waveguide core 12 that is wider than the section 18 and the tapered section 16 provides a width increase from the section 18 to another section (not shown) of the waveguide core 12 that is wider than the section 18. The wider sections of the waveguide core 12 are not phase matched with the cap layer 38. The tapered sections 14, 16 enable the intervening placement of the section 18 that is phase matched with the cap layer 38.

Figure 4A:
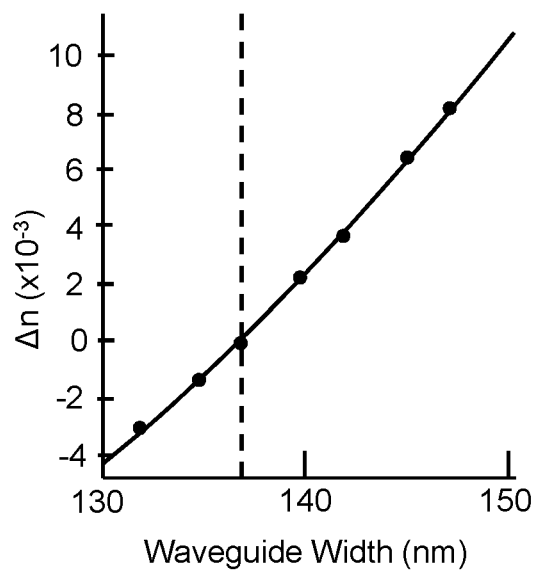
FIG. 4A is a graph plotting the difference between the effective refractive index of a waveguide and the effective refractive index of a cap layer as a function of the width of the waveguide core.

With reference to FIGS. 4, 4A, the phase matching that promotes the selective coupling of modes between the waveguide core 12 and the cap layer 38 may be promoted by matching between the index of refraction of the waveguide core 12 and the index of refraction of the cap layer 38. In an embodiment, the index of refraction of the mode guided by the waveguide core 12 may be made equal to the index of refraction of the mode guided by the cap layer 38 by adjusting the parameters associated with the waveguide core 12.

For example and as best shown in FIG. 4A, the width, w1, of the straight section 18 of the waveguide core 12 may be adjusted to minimize the difference (Δn) between the effective refractive index of the waveguide core 12 and the effective refractive index of the cap layer in order to provide the phase matching between the waveguide core 12 and the cap layer 38. The vertical dashed line in FIG. 4A represents the effective refractive index of a cap layer composed of silicon carbon nitride, and the curve in FIG. 4A represents the effective refractive index of a waveguide core comprised of single-crystal silicon. The vertical dashed line in FIG. 4A crosses the curve in FIG. 4A at or near a mode crossing at which the phase coupling is optimized. The effective refractive index of the waveguide core 12 may be substantially equal to the effective refractive index of the cap layer 38 within a width range of ±10 nanometers (nm) and, preferably, within a width range of ±5 nm in order to provide the phase matching.

Figure 5:
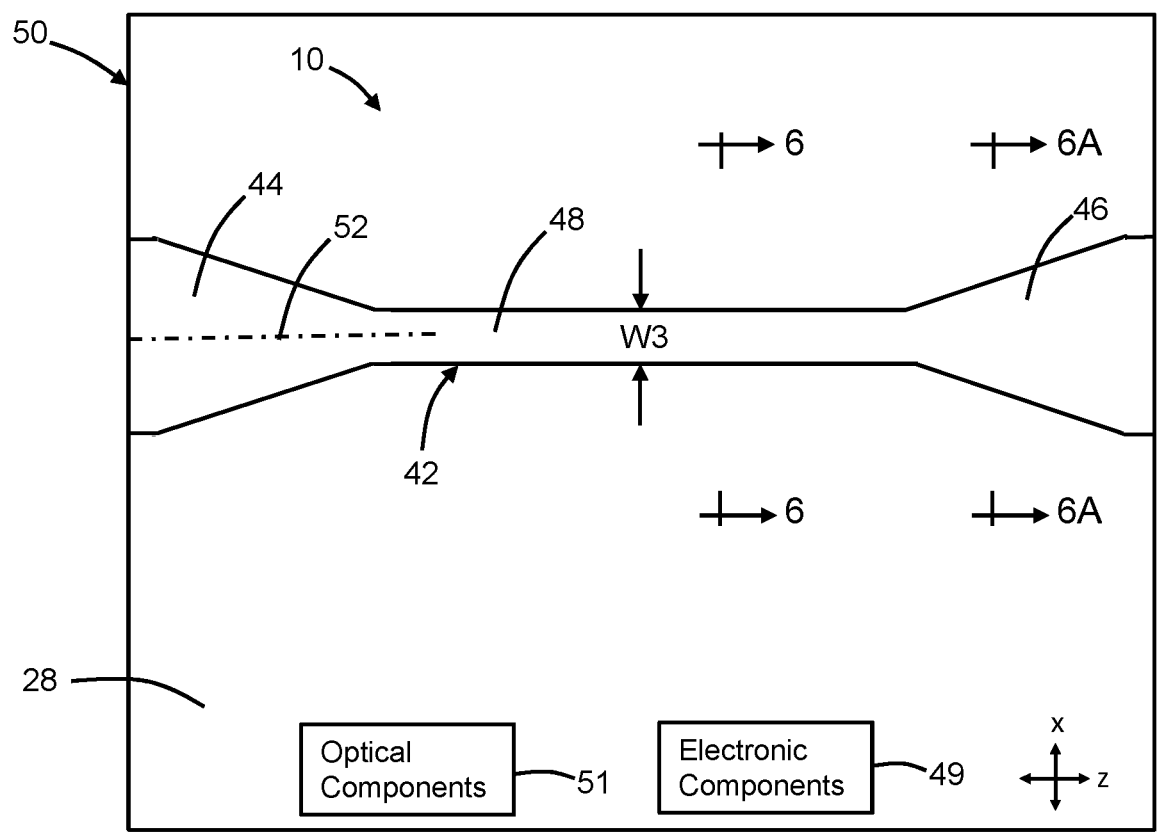
FIG. 5 is a top view of a photonics chip including a structure at an initial fabrication stage of a processing method in accordance with embodiments of the invention.
Figure 6:
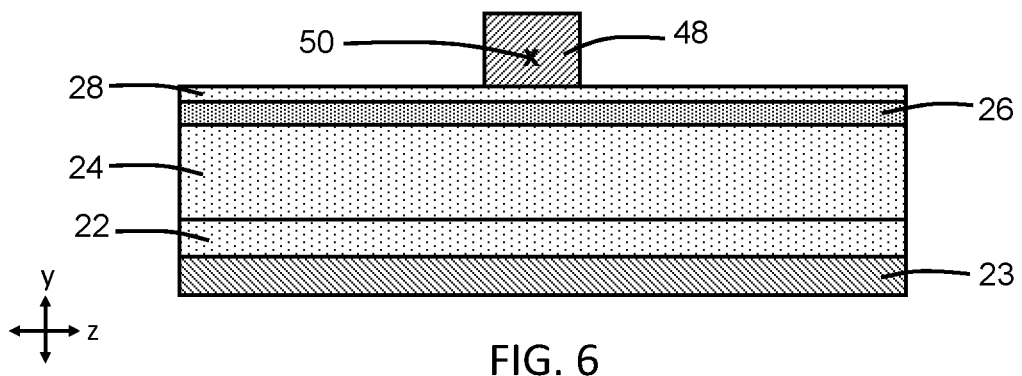
FIG. 6 is a cross-sectional view of the structure taken generally along line 6-6 in FIG. 5.
Figure 6A:
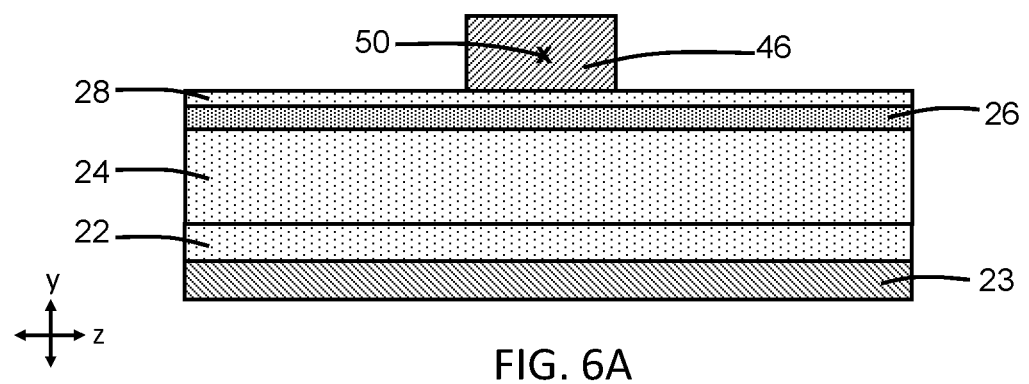
FIG. 6A is a cross-sectional view of the structure taken generally along line 6A-6A in FIG. 5.

With reference to FIGS. 5, 6, 6A and in accordance with alternative embodiments of the invention, the waveguide core 12 may be omitted and, instead, a waveguide core 42 may be formed from a layer composed of a dielectric material, such as silicon nitride, that is deposited and patterned with lithography and etching processes. The deposited dielectric layer may be fully etched during patterning to form the waveguide core 42 as shown or, alternatively, the deposited dielectric layer may be partially etched during patterning to define a ridge waveguide. Similar to the waveguide core 12, the waveguide core 42 includes tapers 44, 46 and a straight section 48 having a width, W3, in the lengthwise direction along a longitudinal axis 52. The waveguide core 12 is arranged over the dielectric layer 28.

The dielectric layer 30 is deposited over the dielectric layer 28 after the waveguide core 42 is formed. The thickness of the dielectric layer 30 may be selected such that the waveguide core 12 is embedded or buried in the dielectric material of the dielectric layer 30. The interconnect structure 32, including the interlayer dielectric layer 34 of the metallization level 36 and the cap layer 38, is then formed over the dielectric layer 30. During use, the phase matching and coupling for selecting a desired mode of an optical signal propagating in the waveguide core 42 is similar to described above in connection with the waveguide core 12.

Figure 7:
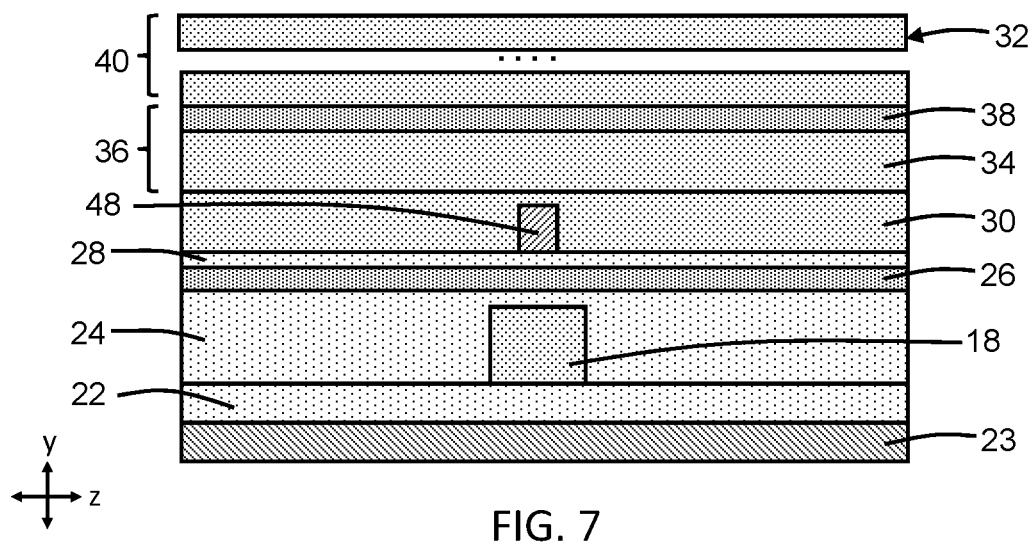
FIGS. 7 and 7A are cross-sectional views similar to FIGS. 3, 3A, respectively, of a structure in accordance with alternative embodiments of the invention.
Figure 7A:
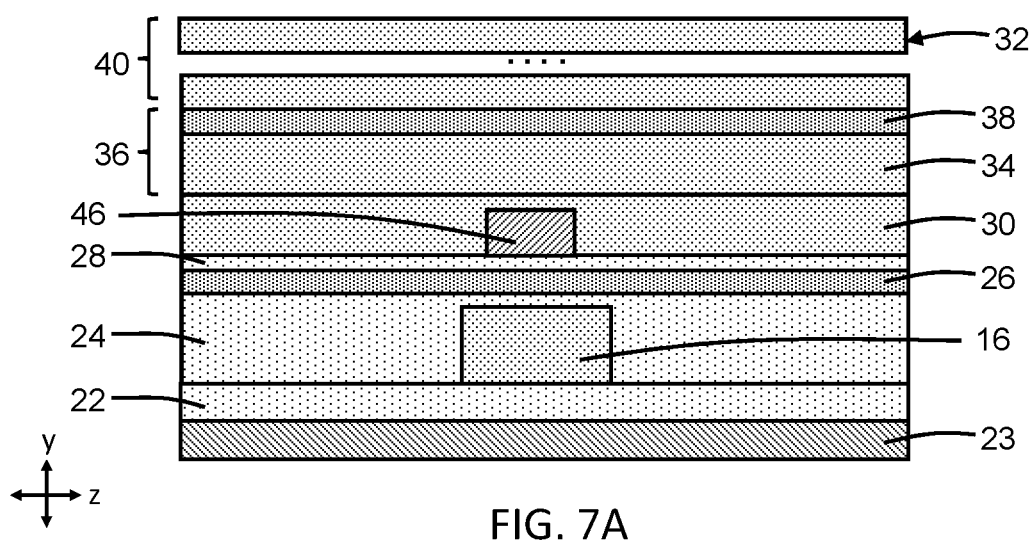
Figure 8:
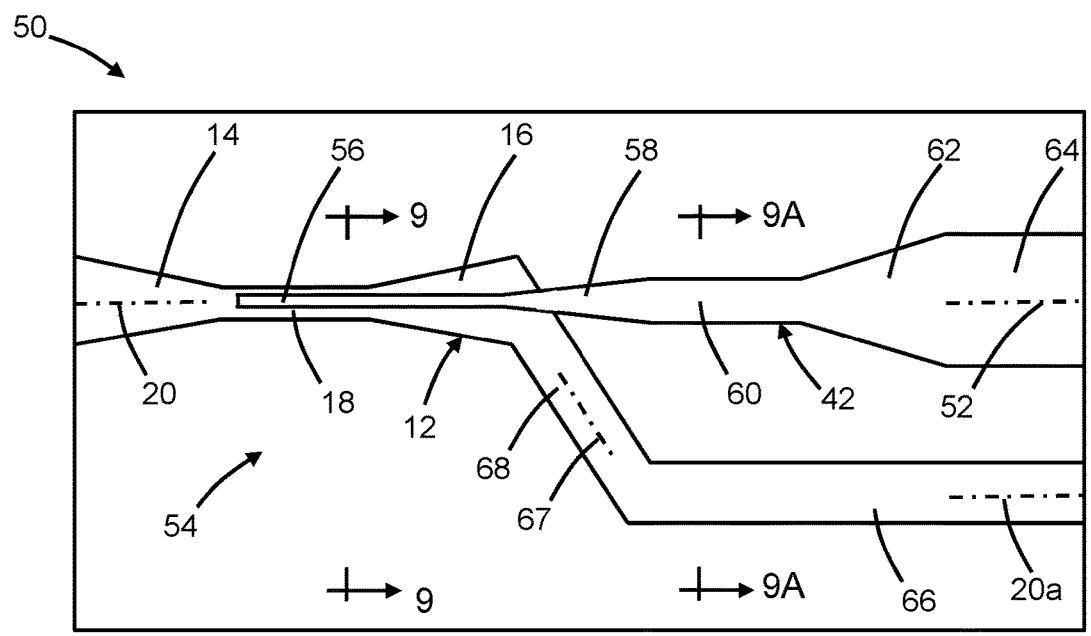
FIG. 8 is a top view of a photonics chip including a structure at an initial fabrication stage of a processing method in accordance with embodiments of the invention.

With reference to FIGS. 7, 7A and in accordance with alternative embodiments of the invention, the structure 10 may be modified to include both of the waveguide cores 12, 42 positioned with a stacked arrangement in which the respective longitudinal axes 20, 52 are aligned parallel or substantially parallel relative to each other with a vertical offset. The structure 10 may operate as a heterostructure-based vertical coupled polarizer in which the TE mode is the desired mode and the TM mode is coupled upward to the cap layer 38, or the structure 10 may operate as a TM polarizer in which the TM mode is the desired mode and the TE mode is coupled upward to the cap layer 38.

With reference to FIGS. 8, 9, 9A, 10 and in accordance with alternative embodiments of the invention, a structure 54 in the form of a vertical polarization splitter includes the waveguide core 12 and the waveguide core 42 that is arranged in part over the waveguide core 12. The waveguide core 42 includes a straight section 56, a straight section 60, a tapered section 58 arranged between straight section 56 and the straight section 60 to provide a width change, a straight section 64, and a tapered section 62 arranged between straight section 60 and the straight section 64 to provide a width change. The width of the straight section 64 is greater than the width of the straight section 60, and the width of the straight section 60 is greater than the width of the straight section 56. The sections 56, 58, 60, 62, 64 of varying width are aligned along the longitudinal axis 51 with a linear arrangement.

The waveguide core 12 includes the tapered sections 14, 16 and the straight section 18 that are aligned along the longitudinal axis 20. The waveguide core 12 further includes another straight section 66 that is aligned along a longitudinal axis 20a that is parallel to the longitudinal axis 20 and offset laterally. The waveguide core 12 further includes another section 68 that connects the tapered section 16 with the straight section 66 and that provides the lateral offset. In an embodiment, the section 68 may be a straight section. In an alternative embodiment, the section 68 may be a bend.

The waveguide core 42 does not include a section arranged over the tapered section 14 of the waveguide core 12. The straight section 56 of the waveguide core 42 is arranged directly over the straight section 18 of the waveguide core 12. In an embodiment, the straight section 56 of the waveguide core 42 has a smaller width than the straight section 18 of the waveguide core 12. The section 56 of the waveguide core 42 is also arranged in part directly over the tapered section 16 of the waveguide core 12.

The straight section 60 and the straight section 64 of the waveguide core 42 are not arranged over any section of the waveguide core 12, but are instead laterally offset from the straight section 66 of the waveguide core 42. The straight sections 60, 64 of the waveguide core 12 may be aligned parallel to the straight section 66 of the waveguide core 42. The longitudinal axis 52 of the waveguide core 42 is offset laterally from the longitudinal axis 20a of the waveguide core 12 due to the presence of the straight section 68, which is not aligned parallel to either of the longitudinal axes 20, 20a and instead has a longitudinal axis 67 that is aligned transverse to the longitudinal axes 20, 20a.

Figure 10:
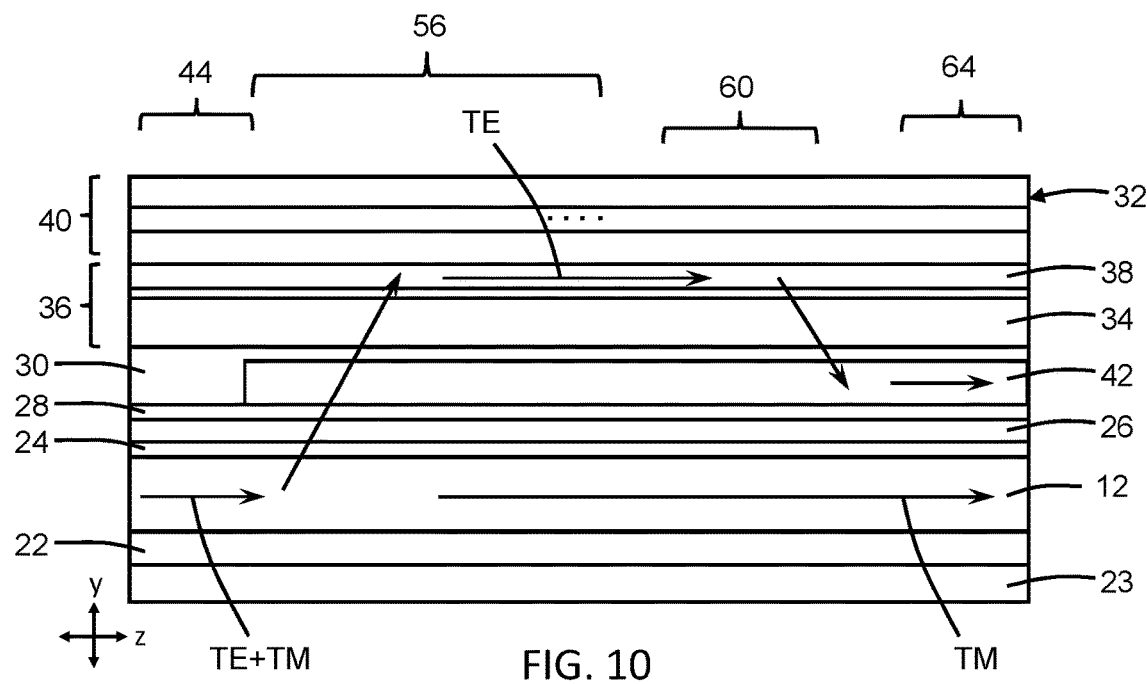
FIG. 10 is a diagrammatic side view of the structure of FIGS. 8, 9, and 9A in which the paths for different modes of a propagating optical signal are illustrated.
Figure 9:
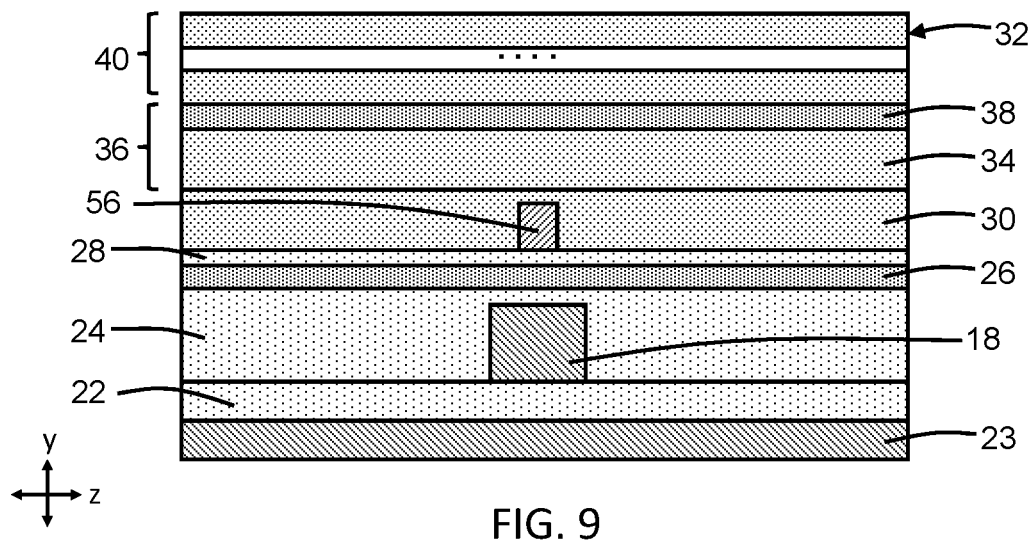
FIG. 9 is a cross-sectional view of the structure taken generally along line 9-9 in FIG. 8.
Figure 9A:
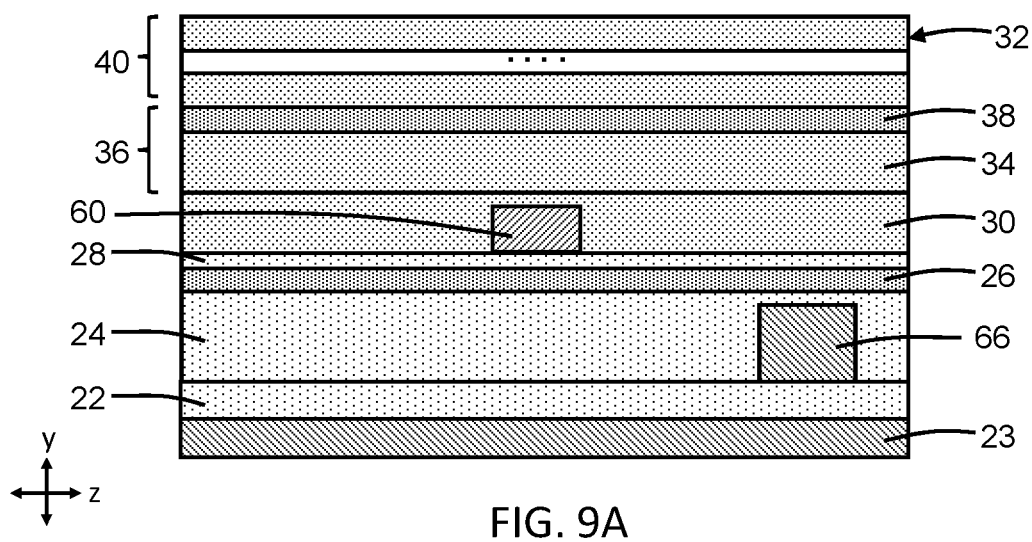
FIG. 9A is a cross-sectional view of the structure taken generally along line 9A-9A in FIG. 8.
Figure 11:
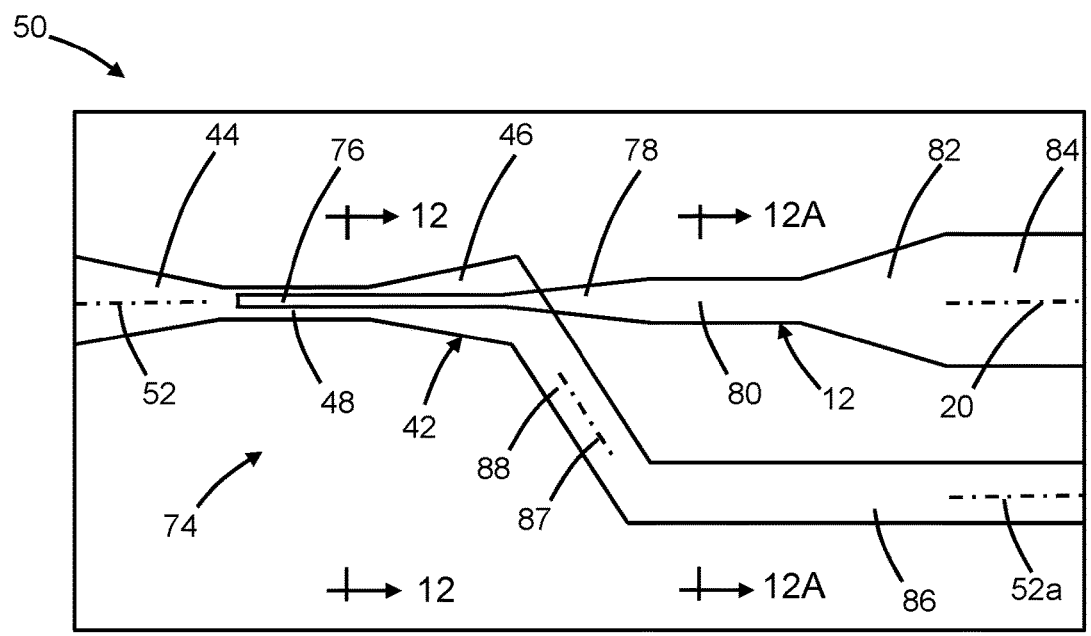
FIG. 11 is a top view of a photonics chip including a structure at an initial fabrication stage of a processing method in accordance with embodiments of the invention.

In use and as best shown in FIG. 10, an optical signal propagating in the waveguide core 12 may enter the structure 54 though the tapered section 14 of the waveguide core 12. The optical signal entering at the input port of the structure 54 may contain multiple modes, such as a transverse electric (TE) mode and a transverse magnetic (TM) mode. The structure 54 may be used as a vertical polarization splitter to separate the two different modes among the two different waveguide cores 12, 42. The vertical polarization splitter diverts one of the different modes of the optical signal arriving in the waveguide core 12 to the waveguide core 42 for output from the structure 54, while the other mode of the optical signal is exclusively guided by the waveguide core 12 from the input port of the structure 54 to the output port of the structure 54.

To this end, because of phase matching between the section 18 of the waveguide core 12 and the cap layer 38, one of the modes (e.g., the TE mode) in the arriving optical signal may be shifted upwardly by the phase-matching between the section 18 of the waveguide core 12 and the cap layer 38. Due to its narrowed width, the straight section 56 of the waveguide core 42 is not optically coupled with the cap layer 38. Because the phase matching condition is not satisfied, the optical signal of the other mode (e.g., the TM mode) continues unimpeded in the waveguide core 12 in the z-direction of propagation.

The cap layer 38 guides the optical signal of the other mode (e.g., the TE mode) in the z-direction of propagation until the optical signal reaches a location over the straight section 60 of the waveguide core 42. In comparison with the narrower straight section 56, the widened section 60 of the waveguide core 42 provides phase matching between the index of refraction of the waveguide core 42 and the index of refraction of the cap layer 38. Because of the phase matching, the optical signal of the other mode is coupled from the cap layer 38 to the waveguide core 42, and exits the structure 54 though the waveguide core 42. The lateral displacement of the waveguide core 12 relative to the waveguide core 42 ensures the optical signal of the other mode does not couple from the cap layer 38 back to the waveguide core 12.

The phase matching that promotes the selective coupling of one of the modes (e.g., the TE mode) of the optical signal between the waveguide core 12 and the cap layer 38 may be promoted by matching between the index of refraction of the waveguide core 12 and the index of refraction of the cap layer 38. In an embodiment, the index of refraction of the waveguide core 12 in the straight section 18 may be made equal to the index of refraction of the cap layer 38 by adjusting the parameters associated with the waveguide core 12. For example, the width of the straight section 18 of the waveguide core 12 may be adjusted to enable phase matching between the waveguide core 12 and the cap layer 38.

The phase matching that promotes the selective coupling of one of the modes (e.g., the TE mode) of the optical signal between the cap layer 38 and the waveguide core 42 may also be promoted by matching between the index of refraction of the waveguide core 42 and the index of refraction of the cap layer 38. In an embodiment, the index of refraction of the waveguide core 42 may be made equal to the index of refraction of the cap layer 38 by adjusting the parameters associated with the waveguide core 42. For example, the width of the straight section 60 of the waveguide core 42 may be adjusted to enable phase matching between the waveguide core 60 and the cap layer 38.

The phase matching is similar or identical to the phase matched described in connection with FIG. 4A in that the difference between the different indices of refraction is minimized through the selection of the respective widths of the waveguide cores 12, 42.

With reference to FIGS. 11, 12, 12A, 13 and in accordance with alternative embodiments of the invention, a structure 74 in the form of a vertical polarization splitter includes the waveguide core 42 and the waveguide core 12 that is arranged in part under the waveguide core 42. The waveguide core 12 includes a straight section 76, a straight section 80, a tapered section 78 arranged between straight section 76 and the straight section 80 to provide a width change, a straight section 84, and a tapered section 82 arranged between straight section 80 and the straight section 84 to provide a width change. The width of the straight section 84 is greater than the width of the straight section 80, and the width of the straight section 80 is greater than the width of the straight section 76. The sections 76, 78, 80, 82, 84 of varying width are aligned along the longitudinal axis 20 with a linear arrangement.

The waveguide core 42 includes the tapered sections 44, 46 and the straight section 48 that are aligned along the longitudinal axis 52. The waveguide core 42 further includes another straight section 86 that is aligned along a longitudinal axis 52a that is parallel to the longitudinal axis 52 and offset laterally. The waveguide core 42 further includes another section 88 that connects the tapered section 46 with the straight section 86 and that provides the lateral offset. In an embodiment, the section 88 may be a straight section. In an alternative embodiment, the section 88 may be a bend.

The waveguide core 12 does not include a section arranged under the tapered section 44 of the waveguide core 42. The straight section 76 of the waveguide core 12 is arranged directly over the straight section 48 of the waveguide core 42. In an embodiment, the straight section 76 of the waveguide core 12 has a smaller width than the straight section 48 of the waveguide core 42. The section 76 of the waveguide core 12 is also arranged in part directly over the tapered section 46 of the waveguide core 42.

The straight section 80 and the straight section 84 of the waveguide core 12 are not arranged over any section of the waveguide core 42, but are instead laterally offset from the straight section 86 of the waveguide core 12. The straight sections 80, 84 of the waveguide core 42 may be aligned parallel to the straight section 86 of the waveguide core 12. The longitudinal axis 20 of the waveguide core 12 is offset laterally from the longitudinal axis 52a of the waveguide core 42 due to the presence of the straight section 88, which is not aligned parallel to either of the longitudinal axes 52, 52a and instead has a longitudinal axis 87 that is aligned transverse to the longitudinal axes 52, 52a.

Figure 13:
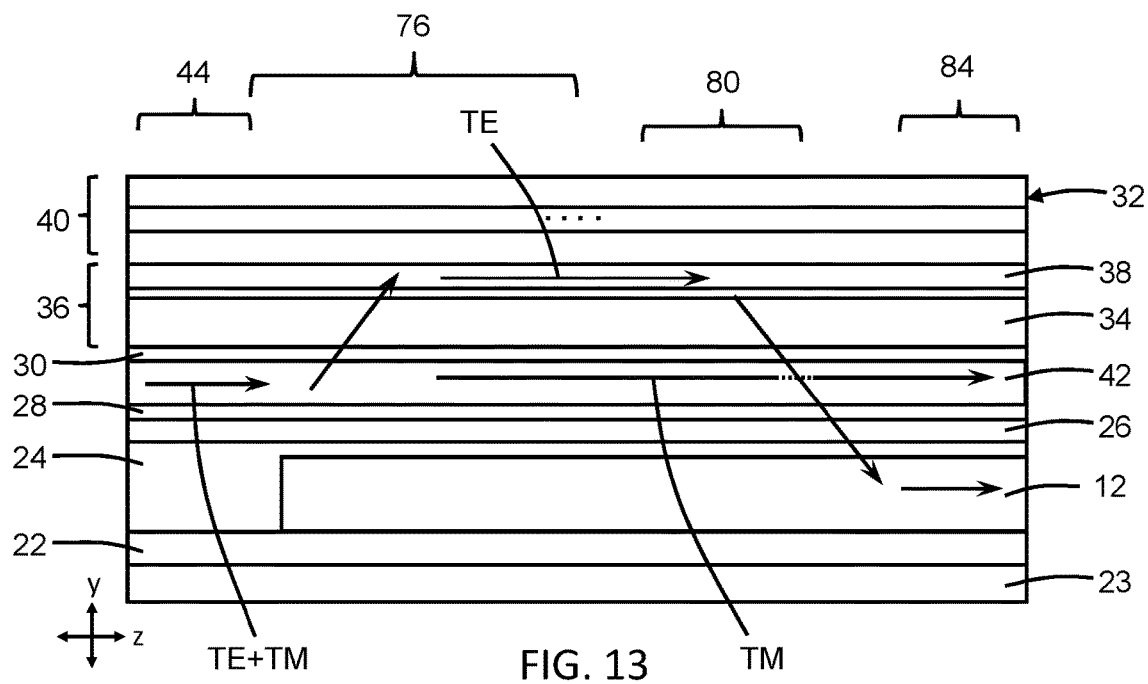
FIG. 13 is a diagrammatic side view of the structure of FIGS. 11, 12, and 12A in which the paths for different modes of a propagating optical signal are illustrated.
Figure 12:
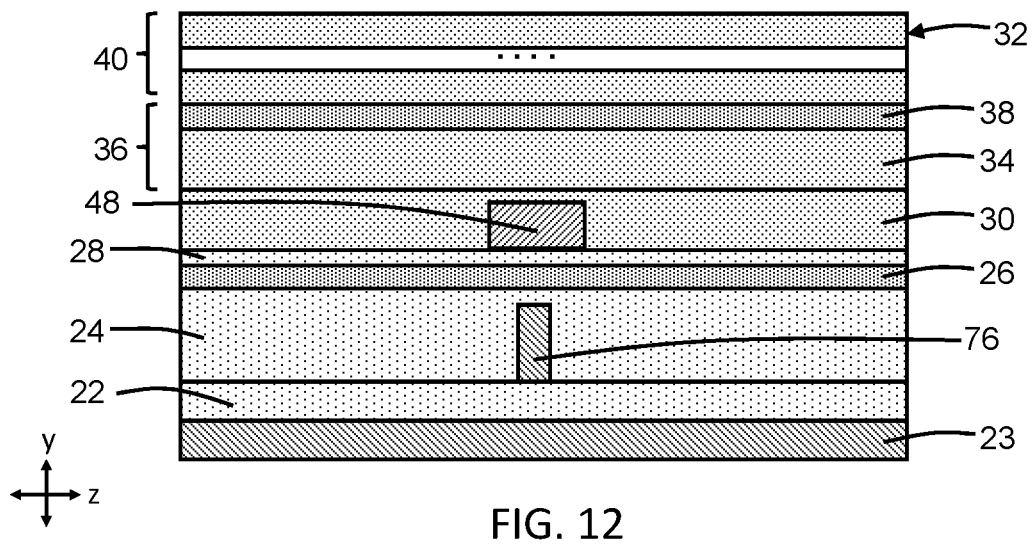
FIG. 12 is a cross-sectional view of the structure taken generally along line 12-12 in FIG. 11.
Figure 12A:
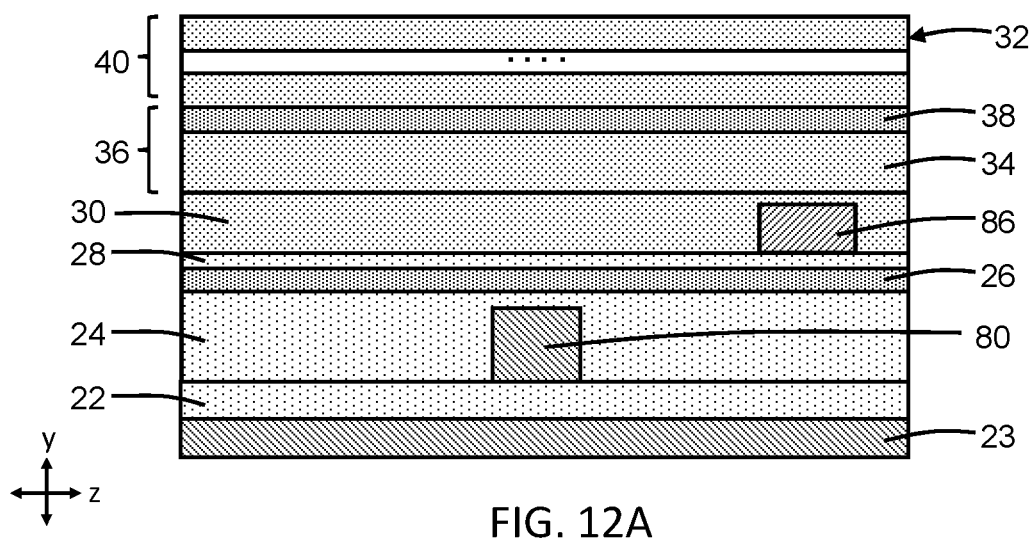
FIG. 12A is a cross-sectional view of the structure taken generally along line 12A-12A in FIG. 11.

In use and as best shown in FIG. 13, an optical signal propagating in the waveguide core 42 may enter the structure 74 though the tapered section 44 of the waveguide core 42. The optical signal entering at the input port of the structure 74 may contain multiple modes, such as a transverse electric (TE) mode and a transverse magnetic (TM) mode. The structure 74 may be used as a vertical polarization splitter to separate the two different modes among the two different waveguide cores 12, 42. The vertical polarization splitter diverts one of the different modes of the optical signal to the waveguide core 12 for output from the structure 74, while the other mode of the optical signal is exclusively guided by the waveguide core 42 from the input port of the structure 54 to the output port of the structure 54.

To this end, because of phase matching between the section 48 of the waveguide core 12 and the cap layer 38, one of the modes (e.g., the TE mode) in the arriving optical signal may be shifted upwardly by the phase-matching between the section 48 of the waveguide core 42 and the cap layer 38. Due to its narrowed width, the straight section 76 of the waveguide core 12 is not optically coupled with the cap layer 38. Because the phase matching condition is not satisfied, the optical signal of the other mode (e.g., the TM mode) continues unimpeded in the waveguide core 42 in the z-direction of propagation.

The cap layer 38 guides the optical signal of the other mode (e.g., the TE mode) in the z-direction of propagation until the optical signal reaches a location over the straight section 80 of the waveguide core 12. In comparison with the narrower straight section 76, the widened section 80 of the waveguide core 12 provides phase matching between the index of refraction of the waveguide core 12 and the index of refraction of the cap layer 38. Because of the phase matching, the optical signal of the other mode is coupled from the cap layer 38 to the waveguide core 12, and exits the structure 54 though the waveguide core 12. The lateral displacement of the waveguide core 42 relative to the waveguide core 12 ensures the optical signal of the other mode does not couple from the cap layer 38 back to the waveguide core 42.

The phase matching that promotes the selective coupling of one of the modes (e.g., the TE mode) of the optical signal between the waveguide core 42 and the cap layer 38 may be promoted by phase matching between the index of refraction of the waveguide core 42 and the index of refraction of the cap layer 38. In an embodiment, the index of refraction of the waveguide core 42 in the straight section 48 may be made equal to the index of refraction of the cap layer 38 by adjusting the parameters associated with the waveguide core 42. For example, the width of the straight section 48 of the waveguide core 42 may be adjusted to enable phase matching between the waveguide core 42 and the cap layer 38.

The phase matching that promotes the selective coupling of one of the modes (e.g., the TE mode) of the optical signal between the cap layer 38 and the waveguide core 12 may also be promoted by matching between the index of refraction of the waveguide core 12 and the index of refraction of the cap layer 38. In an embodiment, the index of refraction of the waveguide core 12 may be made equal to the index of refraction of the cap layer 38 by adjusting the parameters associated with the waveguide core 12. For example, the width of the straight section 80 of the waveguide core 12 may be adjusted to enable phase matching between the waveguide core 80 and the cap layer 38.

The phase matching is similar or identical to the phase matched described in connection with FIG. 4A in that the difference between the different indices of refraction is minimized through the selection of the respective widths of the waveguide cores 12, 42.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction perpendicular to the horizontal, as just defined. The term "lateral" refers to a direction within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or "in direct contact with" another feature if intervening features are absent. A feature may be "indirectly on" or "in indirect contact with" another feature if at least one intervening feature is present.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure for a photonics chip, the structure comprising:
   a back-end-of-line interconnect structure including an interlayer dielectric layer and a cap layer stacked over the interlayer dielectric layer, the cap layer comprised of silicon carbon nitride;
   a first waveguide core including a first section and a second section arranged beneath the cap layer, and a third section connecting the first section with the second section, the first section of the first waveguide core aligned along a first longitudinal axis, the second section aligned along a second longitudinal axis that is offset laterally from the first longitudinal axis; and
   a second waveguide core including a first section that is arranged in a vertical direction at least in part between the first waveguide core and the cap layer,
   wherein the first waveguide core has a first index of refraction, the cap layer has a second index of refraction, and the first section of the first waveguide core has a first width that is selected such that the first index of refraction is substantially equal to the second index of refraction.

2. The structure of claim 1 wherein the first section of the second waveguide core is aligned along a third longitudinal axis that is substantially parallel to the first longitudinal axis.

3. The structure of claim 1 wherein the second waveguide core has a third index of refraction, and the first section of the second waveguide core has a second width that is selected such that the third index of refraction is substantially equal to the second index of refraction.

4. A structure for a photonics chip, the structure comprising:
   a back-end-of-line interconnect structure including an interlayer dielectric layer and a cap layer stacked over the interlayer dielectric layer, the cap layer comprised of silicon carbon nitride;
   a first waveguide core including a first section arranged beneath the cap layer and aligned along a first longitudinal axis, a second section aligned along a second longitudinal axis that is offset laterally from the first longitudinal axis, and a third section connecting the first section with the second section; and
   a second waveguide core including a first section arranged in a vertical direction under the first waveguide core,
   wherein the first section of the first waveguide core is at least in part arranged between the second waveguide core and the cap layer, the first waveguide core has a first index of refraction that varies as a function of width, the cap layer has a second index of refraction, and the first section of the first waveguide core has a first width that is selected such that the first index of refraction is substantially equal to the second index of refraction.

5. The structure of claim 4 wherein the first section of the second waveguide core is aligned along a third longitudinal axis that is substantially parallel to the first longitudinal axis.

6. The structure of claim 4 wherein the second waveguide core has a third index of refraction, and the first section of the second waveguide core has a second width that is selected such that the third index of refraction is substantially equal to the second index of refraction.

7. A method of forming a structure a photonics chip, the method comprising:
- forming a first waveguide core;
- forming an interlayer dielectric layer of a back-end-of-line interconnect structure; and
- forming a cap layer of the back-end-of-line interconnect structure over the interlayer dielectric layer and at least a first section of the first waveguide core,
- wherein the cap layer is comprised of silicon carbon nitride, the first waveguide core further includes a second section and a third section that are arranged beneath the cap layer, the first section is aligned along a longitudinal axis with the second section and the third section, the first section is arranged along the longitudinal axis between the second section and the third section, and the second section and the third section are each tapered with a second width that increases with increasing distance from the first section, the first waveguide core has a first index of refraction, the cap layer has a second index of refraction, and the first section of the first waveguide core has a first width that is selected such that the first index of refraction is substantially equal to the second index of refraction.

8. The method of claim 7 wherein the first waveguide core is comprised of single-crystal silicon.

9. The method of claim 7 wherein the first waveguide core is comprised of silicon nitride.

10. The structure of claim 3 wherein the second width is less than the first width, and the first section of the second waveguide core is arranged directly over the first section of the first waveguide core.

11. The structure of claim 1 wherein the second waveguide core further includes a second section, a third section, fourth section connecting the first section with the second section, and a fifth section connecting the second section with the third section.

12. The structure of claim 11 wherein the first section, the second section, and the third section of the second waveguide core have a straight shape, the second section of the second waveguide core is wider than the first section of the second waveguide core, the third section is wider than the second section, and the fourth section and the fifth section of the second waveguide core have a tapered shape.

13. The structure of claim 12 wherein the first section, the second section, the third section, the fourth section, and the fifth section of the second waveguide core are aligned along a third longitudinal axis.

14. The structure of claim 1 wherein the second waveguide core further includes a second section, a third section, fourth section connecting the first section with the second section, and a fifth section connecting the second section with the third section.

15. The structure of claim 14 wherein the first section, the second section, and the third section of the second waveguide core have a straight shape, the second section of the second waveguide core is wider than the first section of the second waveguide core, the third section is wider than the second section, and the fourth section and the fifth section of the second waveguide core have a tapered shape.

16. The structure of claim 15 wherein the first section, the second section, the third section, the fourth section, and the fifth section of the second waveguide core are aligned along a third longitudinal axis.

\* \* \* \* \*